Figure 1:
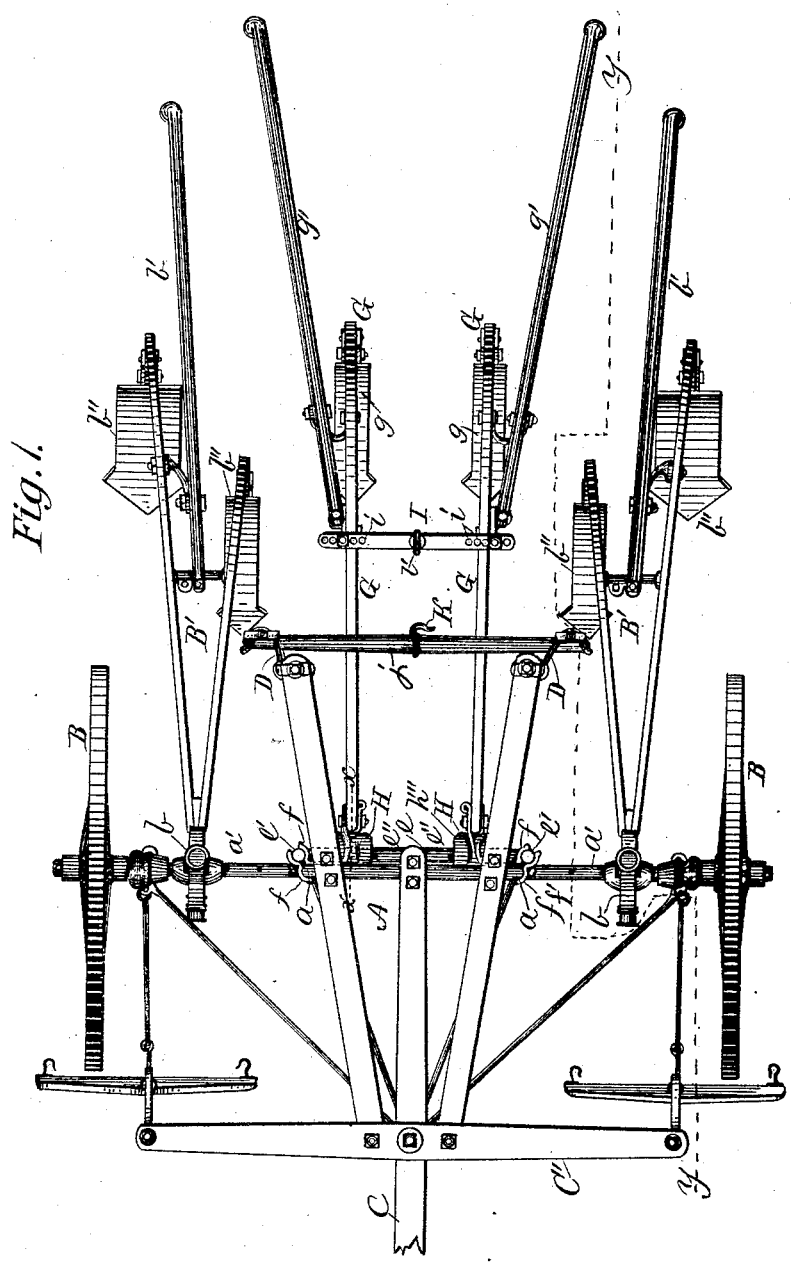

(No Model.)

G. W. BROWN.
CULTIVATOR.

No. 354,389. Patented Dec. 14, 1886.

Witnesses:
W. H. Rowe,
N. M. Richards.

Inventor.
Geo. W. Brown,
By W. B. Richards,
Atty.

(No Model.) 3 Sheets—Sheet 2.

G. W. BROWN.
CULTIVATOR.

No. 354,389. Patented Dec. 14, 1886.

Witnesses:
W. N. Rowe,
H. M. Richards,

Inventor.
Geo. W. Brown,
By W. B. Richards,
Atty.

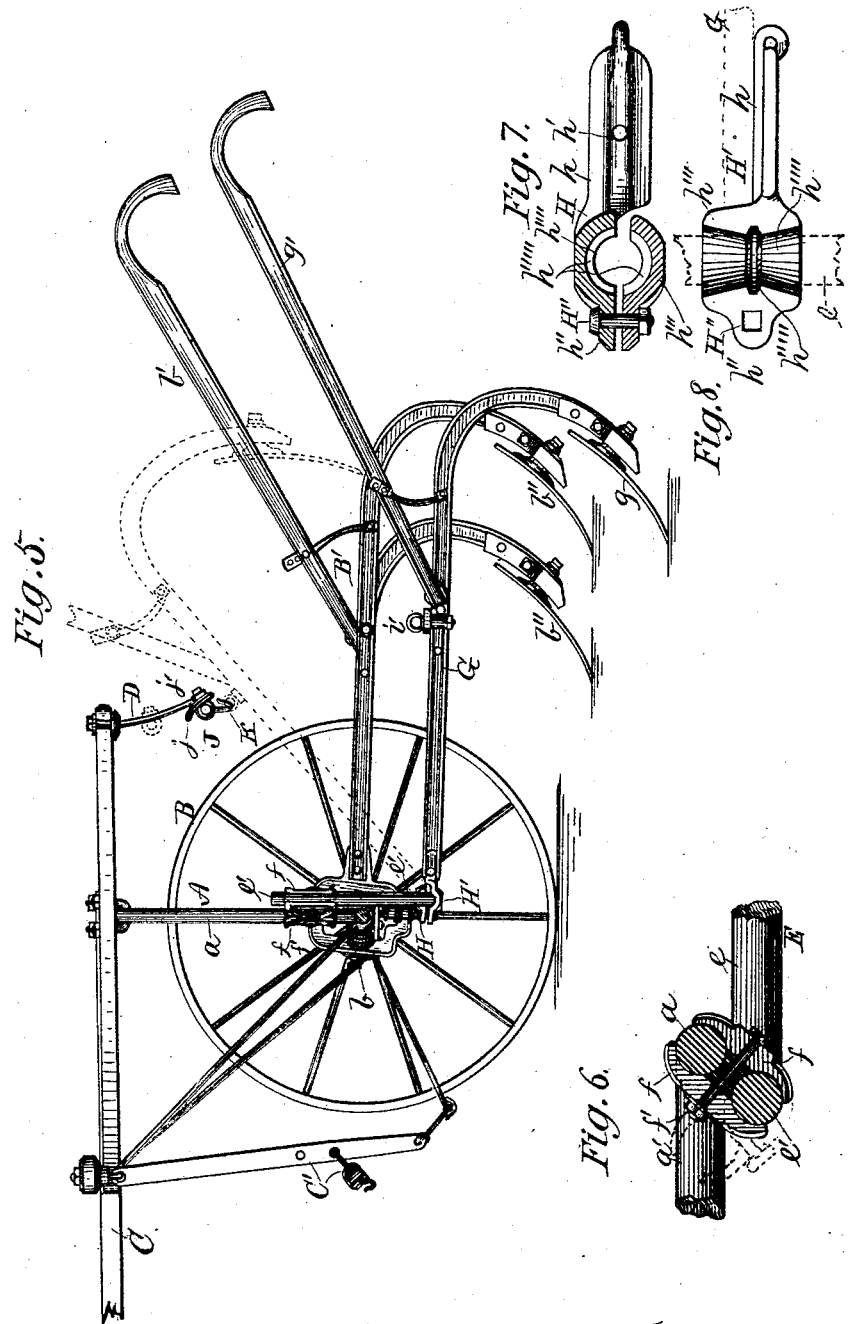

UNITED STATES PATENT OFFICE.

GEORGE W. BROWN, OF GALESBURG, ILLINOIS.

CULTIVATOR.

SPECIFICATION forming part of Letters Patent No. 354,389, dated December 14, 1886.

Application filed March 8, 1886. Serial No. 194,414. (No model.)

*To all whom it may concern:*

Be it known that I, GEORGE W. BROWN, a citizen of the United States, residing at Galesburg, in the county of Knox and State of Illinois, have invented certain new and useful Improvements in Cultivators, of which the following is a specification.

In planting corn with a lister planting-plow, the plow, generally of the double-mold-board type, precedes the furrow-opening, seed-dropping, and covering devices, and opens a broad furrow, in the bottom of which the furrow-opener prepares the opening in the soil for the reception of the seed. This broad furrow formed by the double-mold-board plow in some soils, especially in dry soils, is made several inches deep, and the soil thrown out of this furrow and to the sides thereof will form ridges some inches higher than the natural surface. In cultivating corn planted in this manner the wheels of the ordinary cultivator run upon the elevated ridges of soil, and it is very difficult, if not impossible, to get the plows down to cultivate or stir the soil next to the row of plants, especially in the first cultivation after planting; and the main object of my present invention is to overcome these difficulties by furnishing an attachment to ordinary cultivators which can be used effectively in cultivating corn which has been planted with lister planting-plows in the deepest furrows ever made by such plows; and to this main end and object my invention consists in supplemental cultivator-plows attached to the ordinary cultivator axle or frame in the space between the ordinary plow-beams, and in such lower planes with reference to said plow-beams and the cultivator-wheels as will make these supplemental plows effective in cultivating corn planted by lister planting - plows, as hereinbefore described.

Another object of my invention is to provide means for vertical adjustment of the supplemental cultivator-plow beams to adapt them for use in cultivating plants that stand in deeper or shallower furrows; and to this end my invention consists in the use of means for securing the supplemental plows to an ordinary wheel-cultivator, which means, while furnishing attachment for said supplemental cultivators to the ordinary cultivator frame or axle, will at the same time provide for vertical adjustment thereof.

A further object of my invention is to provide means for attaching the supplemental plows to cultivator axles or frames of various widths; and to this end or object my invention consists in the use of adjustable clamps for securing the bar or bars which carry the supplemental plow-beams to the ordinary cultivator axle or frame.

Further combinations and features of construction in which my invention consists will be hereinafter described, and will be pointed out in the claims.

Figure 2:
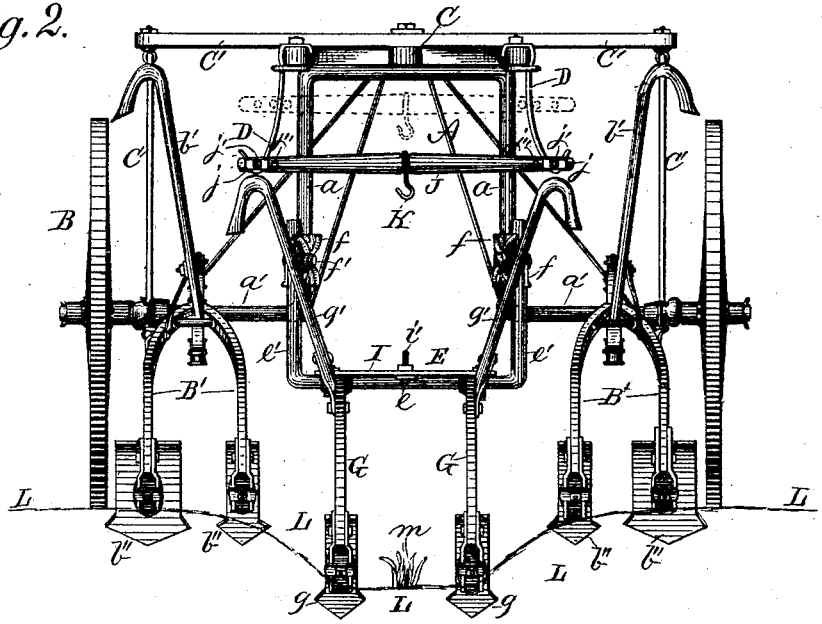
Figure 3:
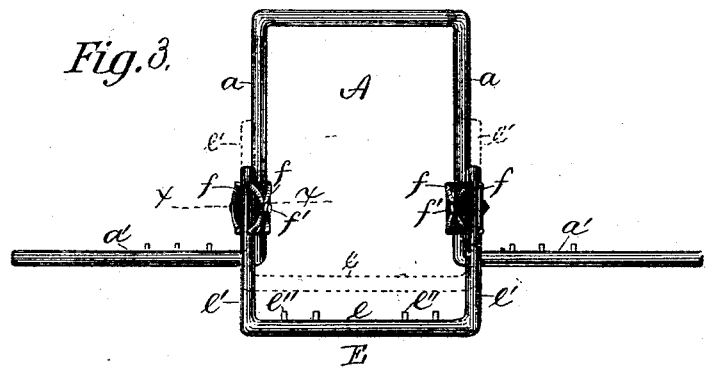
Figure 4:
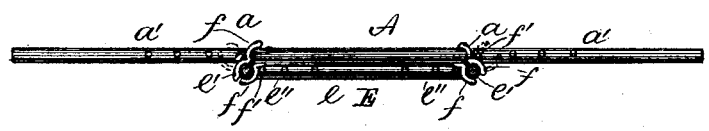

In the accompanying drawings, which illustrate one method of applying my improvements, Figure 1 is a top plan of an ordinary wheel-cultivator with my attachments; Fig. 2, a rear elevation; Fig. 3, a rear elevation of the cultivator-axle and of part of my attachments; Fig. 4, a top plan of the parts shown at Fig. 3; Fig. 5, a sectional elevation in the line $yy$ in Fig. 1; Fig. 6, a sectional plan in line $xx$ in Fig. 3; Fig. 7, a vertical central sectional elevation of the coupling of a supplemental cultivator in line $xx$ in Fig. 1; Fig. 8, a top plan of the lower joint-piece of Fig. 7.

In the different figures of the drawings the same reference-letter indicates the same part.

I have shown in the drawings a wheel-cultivator of that general class which is adapted to cultivate both sides of a row of plants simultaneously as the implement is drawn across the field, and to which class of cultivators my invention relates. There are different types of this general class of cultivators, some being operated by an attendant who walks behind the plows, and others by an attendant who rides on the machine, some in which a frame-work forms the central part and is provided with stub-axles or other axles for the supporting-wheels, and others in which the axle is formed of a bar or bars bent to form an elevated central part and to form journals for the supporting-wheels, some in which the axles are rigid with reference to the frame or central part of the machine, and others in which the axles are jointed, so that the wheels can be turned with reference to the central part of the machine; but in all the different types of this general class of cultivators two plows or gangs of plows are used—one to operate on each side of the row of plants.

It is not deemed necessary to give herein more than a brief general description of this ordinary type of cultivator, which consists, as shown in the drawings, of an axle, A, bent to form an arched central part, with approximately vertical side parts, $a$, and horizontal end parts, $a'$. To each part $a'$ a supporting-wheel, B, is journaled, and a plow-gang, B', is connected by a hinge or coupling, $b$, and each gang is provided with handles $b'$ and shovels or plows proper, $b''$. A tongue or guide-pole, C, is fixed on the axle, a draft device, C', mounted on the tongue and axle, and pendent hooks D fixed to the rear forked end of the draft-pole, for suspending the plows when required. The ordinary operation of this type of cultivator is too well known to require any description here.

In connection with the accompanying drawings, I will describe one method of applying my invention to the type of cultivator shown, and it is believed that from this description and the drawings any mechanic merely skilled in this art can, with the exercise merely of his mechanical skill, apply my invention to the different types of the general class of cultivators hereinbefore described.

E is a bar, bent or otherwise constructed to have a central part, $e$, with end parts, $e'$, approximately at right angles thereto. Each end $e'$ of the bar E is connected to one of the vertical parts $a$ of the axle A by means of clamp-plates $f\!f$ and a bolt and nut, $f'$, so that the bar E may be adjusted vertically with reference to the axle A, and be held after adjustment by said clamps, with its part $e$ located between the parts $a'$ of the axle A, as shown by dotted lines at Fig. 3.

The bar E can be secured to cultivators in which the bars $a$ are at different distances apart by turning the clamp-plates as indicated by dotted lines at Figs. 4 and 6. The part $e$ of the bar E, as shown, has projecting studs $e''$, for purposes hereinafter described.

G G are my supplemental plow-gangs, each provided with a shovel or shovels, $g$, and when used as a walking-plow with a handle, $g'$.

The gangs G may be hinged to the part $e$ of the bar E in various ways; but I prefer hinging them as follows: H H' are coupling-plates, each having an end, $h$, with holes $h'$ $h''$, a lateral extension, $h'''$, and a transverse groove, $h''''$, enlarged at each end, as shown at Fig. 8. $h'''''$ is a groove mid-length the groove $h''''$ and transversely thereto. The plates H H' are placed one on each side of the forward end of a plow-beam, as shown, and their lateral extensions $h'''$ will project one in each direction across and in front of the plow-beam. Bolts pass through the holes $h'$ to fix the plates H H' to the plow-beam, and a bolt, H'', passes through the hole $h''$ in each plate, to clamp them on the supplemental attachment $e$ with pressure sufficient to hold them in place, while permitting them to turn freely thereon, to provide means for swinging the supplemental gangs vertically. The plates H H' may be adjusted laterally on the bar $e$ to adjust the distance between the supplemental gangs, and are held after adjustment from sliding on said bar by means of the pins $e''$, which slide in the grooves $h''''$ when the rear ends of the plow-gangs are raised and lowered. The enlarged ends of the grooves $h''''$ will permit swinging the supplemental plow-gangs laterally to a limited extent.

I have shown the gangs G connected together by a bar, I; but this bar may be dispensed with, as it forms no part of my invention. The bar I has a series of holes, $i$, in each end, through which bolts pass to secure it to the gangs, and whereby it may be adjusted to adjust the gangs to suit lateral adjustments in distance between them at their forward ends.

J is a bar secured to the hang-up pendants D by clamp-plates $j$ and bolts $j'$, which bolts pass through either of the series of holes $j''$ in the bar J. The bar J can be adjusted at different heights on the pendants D, as shown by dotted lines at Fig. 2, and held after adjustment by the clamps $j$.

K is a hook secured to the bar J, with which the eye or hook $i'$ on the bar I may be engaged to suspend the gangs G, for local transportation, on the cultivator-wheels.

At Fig. 2 I have shown by a line, L, an approximation of the soil-surface line transverse to a row of plants, $m$, which have been planted by a lister planting-plow, and have at same figure shown the positions of the ordinary cultivator and my improvement with reference thereto.

The wheels B run upon the ridge of soil which has been thrown up by the lister-plow, and my supplemental gangs of plows are at such low positions with reference to the wheels that they can be used to the best advantage in cultivating the row of plants in the low furrow made by the lister-plow. By adjusting the supplemental bar E in higher or lower planes the supplemental gangs are adjusted to cultivate plants in deeper or shallower lister-plow furrows, and the bar J may be adjusted, as hereinbefore described, to adapt it to these adjustments of the bar E. When the supplemental gangs G are used, as described, the gangs B' may be removed from the machine, if preferred; but I prefer to use them, as they will penetrate the ridge of soil, as shown at Fig. 2, and tend not only to pulverize and till it, but also to lower it or move its soil toward the furrow and the plants to such an extent that the supplemental plows may be dispensed with at the next cultivation and the ordinary gangs only used. As these supplemental gangs are intended for use while the plants are small, I prefer to use them connected, as described; but this connection does not interfere with their simultaneous laterally-swinging movement, nor their swinging movement together vertically, and, being loose, permits of a limited swinging movement of the gangs independently and vertically. If preferred, however, the connecting-bar I may be removed, and the gangs thereby have independent vertical and lateral swinging movement.

By the means hereinbefore described I provide a thoroughly-practical and greatly-needed device for the class of work described, and which can be readily, easily, and cheaply attached to any cultivator of the general class hereinbefore recited, and which when attached thereto extends the working capacity of the cultivator and enables it to effect a result of which the machine was not before capable.

Having thus explained the principle of my invention and the best mode in which I have contemplated applying that principle so as to distinguish it from other inventions, I will now point out what I claim as new and desire to secure by Letters Patent:

1. In combination with an ordinary cultivator of the general class hereinbefore described, supplemental gang or gangs of plows located between said ordinary gangs and a device adapted for attachment to said ordinary cultivator, and to which said supplemental gangs may be secured in a lower plane than the ordinary gangs, substantially as and for the purpose specified.

2. In combination with an ordinary cultivator of the general class hereinbefore described, supplemental plow-gangs located between the ordinary gangs, and a bar or bars connected with the ordinary cultivator axle or frame and extended downward for connection thereto of the supplemental gangs in a plane below the ordinary gangs, substantially as and for the purpose specified.

3. In combination with an ordinary cultivator of the general class hereinbefore described, supplemental plow-gangs located between the ordinary gangs, and a bar or bars adjustably connected with the ordinary cultivator axle or frame, whereby it may be adjusted in higher or lower planes with reference thereto, and to which the supplemental gangs are connected, substantially as and for the purpose specified.

4. In combination with an ordinary cultivator of the general class hereinbefore described, supplemental plow-gangs located between the ordinary gangs, and a bar or bars adjustably connected with the ordinary cultivator axle or frame, whereby it may be adjusted laterally with reference thereto, and to which the supplemental gangs are connected, substantially as and for the purpose specified.

5. In combination with an ordinary cultivator of the general class hereinbefore described, supplemental plow-gangs located between the ordinary gangs, and a bar or bars adjustably connected with the ordinary cultivator axle or frame, whereby it may be adjusted in higher or lower planes, and also laterally with reference thereto, and to which the supplemental gangs are connected, substantially as and for the purpose specified.

6. In a cultivator, in combination with the axle A, having approximately vertical parts $a$, the bar E, having horizontal part $e$ and arms $e'$, and the clamp-plates $f$, by means of which the bar E is adjustably secured to the axle, substantially as and for the purpose described.

7. In combination with an ordinary cultivator of the type herein described, the vertically-adjustable bar E, the supplemental plow-gangs, and the vertically-adjustable hang-up device, substantially as and for the purpose specified.

8. In combination with an ordinary cultivator of the general class hereinbefore described, supplemental plow-gangs located between the ordinary plow-gangs, a bar or bars adjustably connected with the ordinary cultivator axle or frame, whereby it and the supplemental gangs may be adjusted in lower or higher planes, and a hang-up device, also adjustable in higher or lower planes, substantially as and for the purpose specified.

9. In a cultivator, in combination with the plow gang or beam and the horizontal arm $a'$, a coupling formed of plates H H', having ends $h$, holes $h'$, grooves $h''''$ $h'''''$, hole $h''$, and its bolt, substantially as and for the purpose described.

In testimony whereof I affix my signature in presence of two witnesses.

GEORGE W. BROWN.

Witnesses:
I. S. PERKINS,
JAMES E. BROWN.